(12) United States Patent
Schwartz et al.

(10) Patent No.: US 7,627,890 B2
(45) Date of Patent: Dec. 1, 2009

(54) METHODS, SYSTEMS, AND COMPUTER PROGRAM PRODUCTS FOR PROVIDING CONTENT SYNCHRONIZATION OR CONTROL AMONG ONE OR MORE DEVICES

(75) Inventors: Eric Schwartz, Smyrna, GA (US); Craig Cavanaugh, Atlanta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 537 days.

(21) Appl. No.: 11/358,181

(22) Filed: Feb. 21, 2006

(65) Prior Publication Data

US 2007/0199035 A1     Aug. 23, 2007

(51) Int. Cl.
*H04N 7/16* (2006.01)
*G06F 3/00* (2006.01)
*G06F 13/00* (2006.01)
*H04N 5/445* (2006.01)

(52) U.S. Cl. .................. 725/141; 725/135; 725/136; 725/61; 725/139

(58) Field of Classification Search .................. 725/141
See application file for complete search history.

(56) References Cited

U.S. PATENT DOCUMENTS

| | | | |
|---|---|---|---|
| 5,861,881 A * | 1/1999 | Freeman et al. | 715/201 |
| 6,240,555 B1 * | 5/2001 | Shoff et al. | 725/110 |
| 6,792,618 B1 * | 9/2004 | Bendinelli et al. | 725/112 |
| 7,237,253 B1 * | 6/2007 | Blackketter et al. | 725/61 |
| 2002/0049975 A1 * | 4/2002 | Thomas et al. | 725/60 |
| 2002/0162115 A1 * | 10/2002 | Bruckner et al. | 725/105 |
| 2003/0189668 A1 * | 10/2003 | Newnam et al. | 348/468 |
| 2008/0010342 A1 * | 1/2008 | Gebhardt et al. | 709/204 |

* cited by examiner

*Primary Examiner*—Christopher Kelley
*Assistant Examiner*—Usha Raman
(74) *Attorney, Agent, or Firm*—Cantor Colburn LLP

(57) ABSTRACT

Exemplary embodiments include a system for providing content including: a controller in operable communication with a first display device and a second display device that provides first interactive content to the first display device and second interactive content to the second display device and an interface for receiving a command from a user or application. The controller selectively controls the first and second content displayed by the first and second display devices, respectively, in response to the command.

17 Claims, 4 Drawing Sheets

METHODS, SYSTEMS, AND COMPUTER PROGRAM PRODUCTS FOR PROVIDING CONTENT SYNCHRONIZATION OR CONTROL AMONG ONE OR MORE DEVICES

BACKGROUND

The present disclosure relates generally to content synchronization. More specifically, the present disclosure relates to methods, systems, and computer program products for providing content synchronization or control among one or more devices.

A number of television companies have produced interactive television (ITV) applications utilizing a home computer for the interactivity and synchronization of the interactive content to the television broadcast. Some examples include TBS ("Friends" and "Dinner & A Movie"), Comedy Central ("Win Ben Stein's Money"), Game Show Network ("Greed"), and ABC ("Who Wants To Be a Millionaire?"). In addition, a smaller number of households have set-top boxes (i.e., cable boxes) or net-top boxes (e.g. AOLTV, UlitmateTV) that are capable of providing television overlays for ITV applications. A number of television companies have either provided ITV applications specifically for AOLTV or UltimateTV, for example, CBS "CSI"), or have provided interactive television applications that can be accessed by both a home computer and a capable set-top box or net-top box (e.g., "Friends", "Greed", etc.).

Typical ITV applications produced to date have been produced after the show production was completed (in cases of taped shows). The interactive content was written to complement the primary video content. Close synchronization of the interactive content with the primary video content to which it related was accomplished through coordination with personnel in the broadcast studio over the telephone. The producers of ITV applications controlled the synchronization from a remote location, and triggered each segment upon a cue from the broadcast operator.

Interactive content can be delivered through one of several different techniques. In the case of a two-screen approach in which the screen for displaying the interactive content is a computer, an open socket can be used whereby the interactive content is pushed to the end user. It is also possible to provide additional content by encoding additional data with the television signal. This process is used, for example, with closed captioning. Another known method for providing interactive content to users, such as users of a net-top box, is to provide a trigger to the end user device, which uses the trigger to retrieve content from a server.

One of the main drawbacks of the current ITV applications is that the user of the ITV applications has little or no control of the synchronization, coordination, or criteria for association of the content provided. For example, if a user is watching a program and wants to view a related content on a secondary display the user will have to manually tune the second display to the desired related content. Additionally, the user may be unable to select a different secondary content than that provided by the ITV application.

SUMMARY

Exemplary embodiments contain a system for providing content including: a controller in operable communication with a first display device and a second display device and that provides first interactive content to the first display device and second interactive content to the second display device; and an interface that receives a command from a user or application, wherein the controller selectively controls the first interactive content displayed by the first display device, and the second interactive content displayed by the second display device in response to the command.

Exemplary embodiments also contain a method for providing interactive content including: transmitting first interactive content to a first display device; transmitting second interactive content to a second display device; receiving a command from a user or application; and controlling display of the first and second interactive content responsive to the command.

Exemplary embodiments further contain a computer program product for providing interactive content, the computer program product including: a storage medium that is readable by a processing circuit and that stores instructions for execution by the processing circuit for facilitating a method including: transmitting first interactive content to a first display device; transmitting second interactive content to a second display device; receiving a command from a user or application; and controlling display of the first and second interactive content responsive to the command.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures.

DETAILED DESCRIPTION

Referring now to the Figures for the purpose of illustration, it is to be understood that standard components or features that are within the purview of an artisan of ordinary skill and do not contribute to the understanding of the various exemplary embodiments are omitted from the Figures to enhance clarity.

Figure 1:
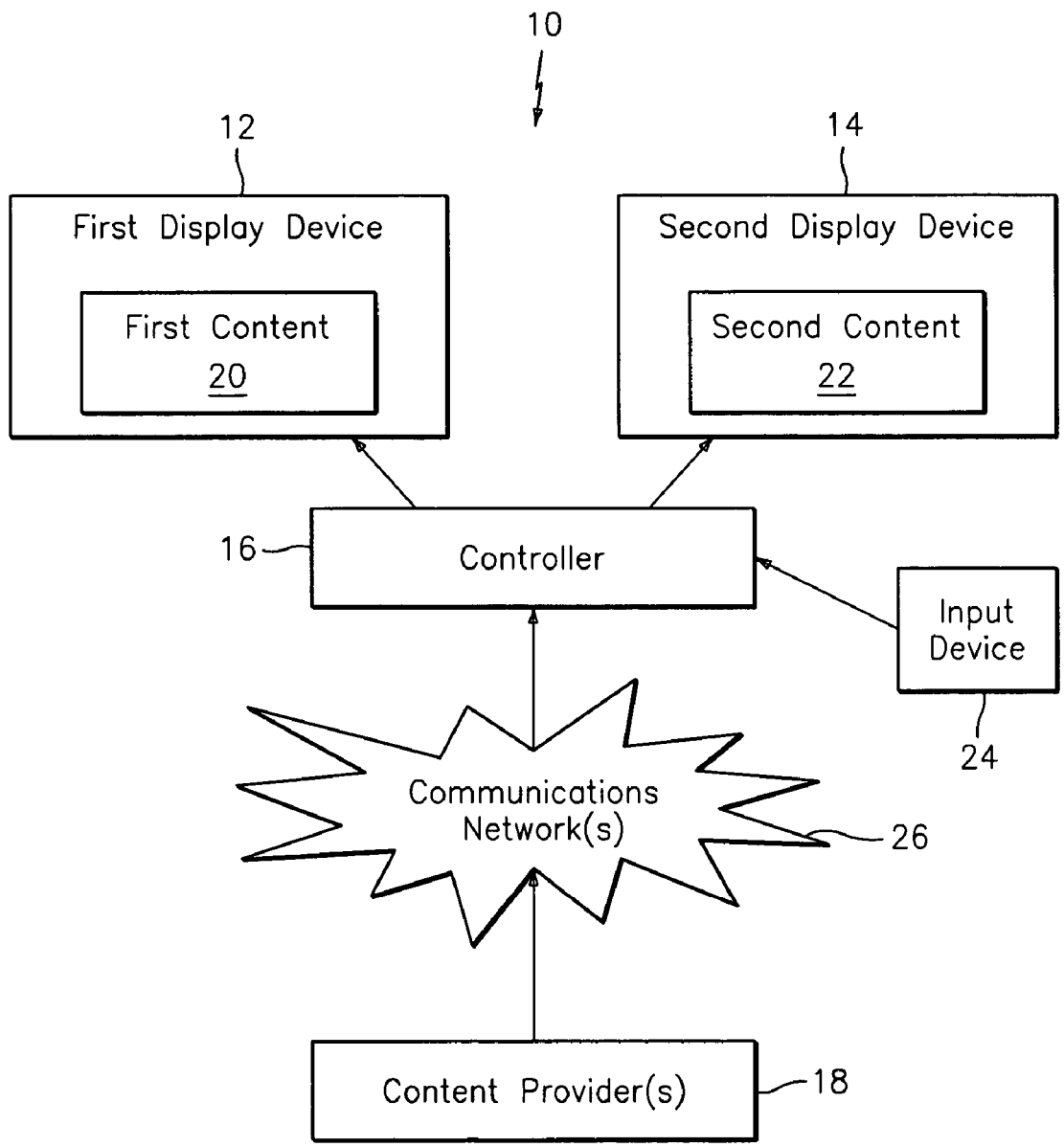
FIG. 1 illustrates a block diagram of a system for providing multi-content synchronization control in exemplary embodiments.

Referring now to FIG. 1, a block diagram of a system for providing multi-content synchronization control in accordance with exemplary embodiments is depicted generally as 10. The system 10 for providing multi-content synchronization control includes a first display device 12, a second display device 14, a controller 16, and a content provider 18. The controller 16 is in operable communication with the first display device 12, the second display device 14, and the content provider 18. Although only one content provider 18 and two display devices 12 and 14 are shown for simplicity of illustration, it should be appreciated that any number of display devices and content providers may be used. The content provider 18 provides content to the controller 16, which selectively provides a first content 20 to the first display device 12 and a second content 22 to the second display device 14, respectively. The controller 16, responsive to a synchronization command received from a user, may selectively synchronize the first and second content 20 and 22 displayed by the first and second display devices 12 and 14. The user or network can define and change primary/secondary/tertiary/etc., content through interaction with the controller 16. In exemplary embodiments, one display device may be designated as the primary display device with additional display devices designated as auxiliary display devices. The system 10 for providing multi-content synchronization control may also include an input device 24 that may be utilized by the user for communicating with the controller 16 via an interface on the controller 16. The input device 24 can be various types of input device including, but not limited to, a remote control, a wired/wireless keyboard, a joystick, keypad on the controller 16, or the like. As those skilled in the art will appreciate, the interface on the controller 16 may be, e.g., an RF receiver, an IR receiver, a keyboard, a serial port, a PS2 port, or the like. In exemplary embodiments, the content provider(s) 18 communicates with the controller 16 over a communications network(s) 26 (e.g., one or more networks that the controller can switch between).

In exemplary embodiments, the controller 16 may be a set-top box receiver similar to a cable box or satellite receiver. In exemplary embodiments, the controller 16 may be integrated into a cable box, a satellite receiver, a computer, television, or in to the network. The controller 16 is capable of communicating with a plurality of display devices including, but not limited to, the first display device 12 and the second display device 14. The controller 16 may also be integrated within the same device as the first and/or second display device 12 and/or 14. The controller 16 is also capable of communicating with one or more input devices including, but not limited to, the content provider 18, or the input device 24. The input devices may communicate with the controller 16 via electrical, infrared (IR), radio frequency (RF), or other wireless protocol such as 802.11x. In other exemplary embodiments, the input device may be integrated with the first controller 16, e.g., a button or series of buttons on the controller 16. In exemplary embodiments, the controller 16 communicates with the content provider 18 via the communications network 26. The communications network 26 may include, but is not limited to, a digital cable system, a digital satellite system, an analog television system, a computer network, audio system, broadband (powerline, DSL, wireless, etc.), or the Internet.

The content provider 18 can be any of various content sources including, but not limited to, cable television providers, digital satellite system providers, traditional analog television providers, digital cable providers, digital broadcast providers, a commercial content provider, a network gaming provider, video cassettes, digital video disks, a traditional radio broadcast provider, a satellite radio broadcast provider, and the like. In exemplary embodiments, the content provider 18 is an Internet content provider, which provides data, video and/or audio via the Internet. It is also to be appreciated that the first and second content 20 and 22 can be provided to the controller 16 using any of a wide range of conventional mediums, including both wireless (e.g., radio frequency) and wired (e.g., cable), and can be received directly (e.g., using a satellite dish), or indirectly (e.g., via a network such as the Internet or a local area network). In exemplary embodiments, the controller 16 may receive the first and second content 20 and 22 from two different content providers and two different communications networks (e.g., the first content 20 may be received from a traditional analog television provider while the second content 22 is received from a digital satellite system provider).

In exemplary embodiments, the controller 16 may be electrically connected to the first and second display devices 12 and 14, or may communicate with the first and second display devices 12 and 14 wirelessly using any known form of wireless communication, such as 802.X or Bluetooth™. The first and second display devices 12 and 14 can be any type of display devices including, but not limited to, a traditional television, a plasma display, an LCD display, a cellular phone display, a computer monitor, a speaker, a scent-producing device, or the like. For example, the first display device 12 may be a traditional television electrically connected to the controller 16 while the second display device 14 may be a cellular phone display in wireless communication with the controller 16. In other exemplary embodiments, the first and second display devices 12 and 14 may be comprised within a single device. For example, the first display device 12 may correspond to a first portion of the television display while the second display device 14 may correspond to another portion of the television display (e.g., a Picture-in-Picture or split screen television display). In other exemplary embodiments, the controller 16 may function as a router or switch and direct the flow of content to the various display devices. The controller 16 may be interacting over the communications network to perform other functions.

In exemplary embodiments, the content provider 18 provides the controller 16 with synchronized content including, but not limited to, the first content 20 and the second content 22. For example, the first content 20 that is displayed by the first display device 12 may be a broadcast of a sporting event, and the second content 22 that is displayed by the second display device 14 may be an interactive content, such as a webpage, related to the sporting event including, but not limited to, stat sheets, player biographies, team news, and the like. The user may elect to un-synchronize the first and second content 20 and 22 such that if the user changes the source of the first content 20, the second content 22 displayed by the second display device 14 will remain unchanged. In exemplary embodiments, the input device 24 may include a synchronize button which allows the user to selectively synchronize the first and second content 20 and 22 being displayed by the first and second display devices 12 and 14 based on rules/policies defined by content provider, the end user, the communications network provider, or another provider.

Continuing with reference to the above example, the user may wish to switch the second content 22 that is being displayed by the second display device 14 to different content without changing the first content 20 displayed by the first display device 12. Additionally, the user may select to synchronize the first and second content 20 and 22 at any time. The ability to synchronize or correlate the first and second content 20 and 22 allows the user to easily access additional desired information and enhances the user's enjoyment of the first content 20. Furthermore, the ability to selectively synchronize or correlate the content being displayed allows the user to have control over his or her entertainment system and allows the user to customize the system to his or her needs. Once the user has selected a new first content 20, such as different content on another channel, he or she may wish to synchronize the second content 22 displayed by the second display device 14 with the first content 20 displayed by the first display device 12. In exemplary embodiments, the controller 16 may include a memory, or cache, that can be used for synchronization as well as storage of content. For example, if the controller 16 is receiving content from two different sources and one source of content is slightly delayed from the other, the controller 16 could use the cache to synchronize the two contents. In another example, the controller 16 may receive a content that can be stored on the controller 16 and displayed by a display device at a later time determined by the user. In exemplary embodiments, the user may use a synchronize button on the input device 24 to selectively synchronize the content being displayed by the various display devices. In other exemplary embodiments, a synchronize button or softkey may be disposed on either the first or second display devices 12 or 14. For example, if the second display device 14 is a cellular phone display, a softkey may be displayed on the cellular phone display alerting the user to an available synchronized content.

In other exemplary embodiments, the first content 20 may be a broadcast of a sporting event from one source, and the second content 22 may be a broadcast of a sporting event from another source. For example, the first content 20 may be a traditional broadcast of a NASCAR™ race, and the second content 22 may be a broadcast of the race from a camera inside a car involved in the race. The user may elect to un-synchronize the second content 22 such that if the user changes the source of the second content 22, the first content 20 will remain unchanged. Continuing with reference to the above example, the user may wish to switch the second content 22 displayed by the second display device 14 to yet another view of the sporting event or to any other source, without changing the first content 20 displayed by the first display device 12.

The content provided by the content provider 18 can be a digital television broadcast, an analog television broadcast, a webpage, audio, video, and/or data content. The content provider 18 and/or the controller 16 may utilize various methods to synchronize the first and second content 20 and 22. In exemplary embodiments, the first and second content 20 and 22 may include a time stamp or sequence number that allows the controller 16 to properly synchronize the first and second content 20 and 22. In other exemplary embodiments, the content provider 18 synchronizes the first and second content 20 and 22 and then synchronously provides them to the controller 16. Synchronization may be time-based, but may also be based on any other aspect of the content, including encoded meta-data.

Figure 2:
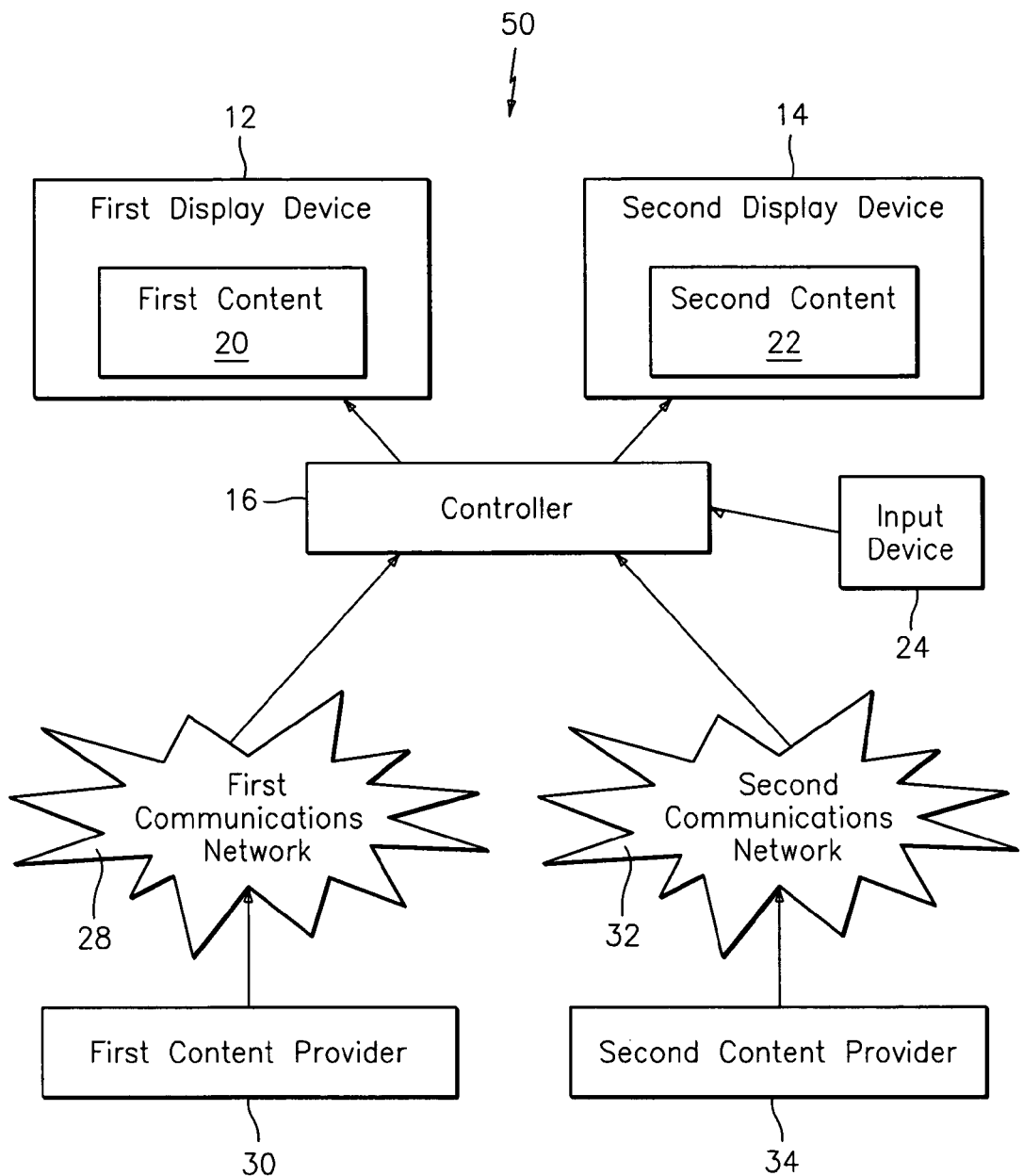
FIG. 2 illustrates another block diagram of a system for providing multi-content synchronization control in exemplary embodiments.

Referring now to FIG. 2, a block diagram of a system for providing multi-content synchronization control in accordance with exemplary embodiments is depicted generally as 50. The system 50 for providing multi-content synchronization control includes the first display device 12, the second display device 14, the controller 16, a first content provider 30, a second content provider 34, a first communications network 28, and a second communications network 32. The controller 16 is in operable communication with the first display device 12, the second display device 14, the first content provider 30, and the second content provider 34. The first content provider 30 and the second content provider 34 both provide content to the controller 16, which selectively provides a first content 20 to the first display device 12, and a second content 22 to the second display device 14. The controller 16, responsive to a synchronization command received from a user, may selectively synchronize the first and second content 20 and 22 displayed by the first and second display devices 12 and 14. The user or network can define and change primary/secondary/tertiary/etc., content through interaction with the controller. In exemplary embodiments, one display device may be designated as the primary display device with additional display devices designated as auxiliary display devices. The system 50 for providing multi-content synchronization control may also include the input device 24 that may be utilized by the user for communicating with the controller 16. In exemplary embodiments, the first content provider 30 communicates with the controller 16 over a first communications network 26, and the second content provider 34 communicates with the controller 16 over a second communications network 32.

Figure 3:
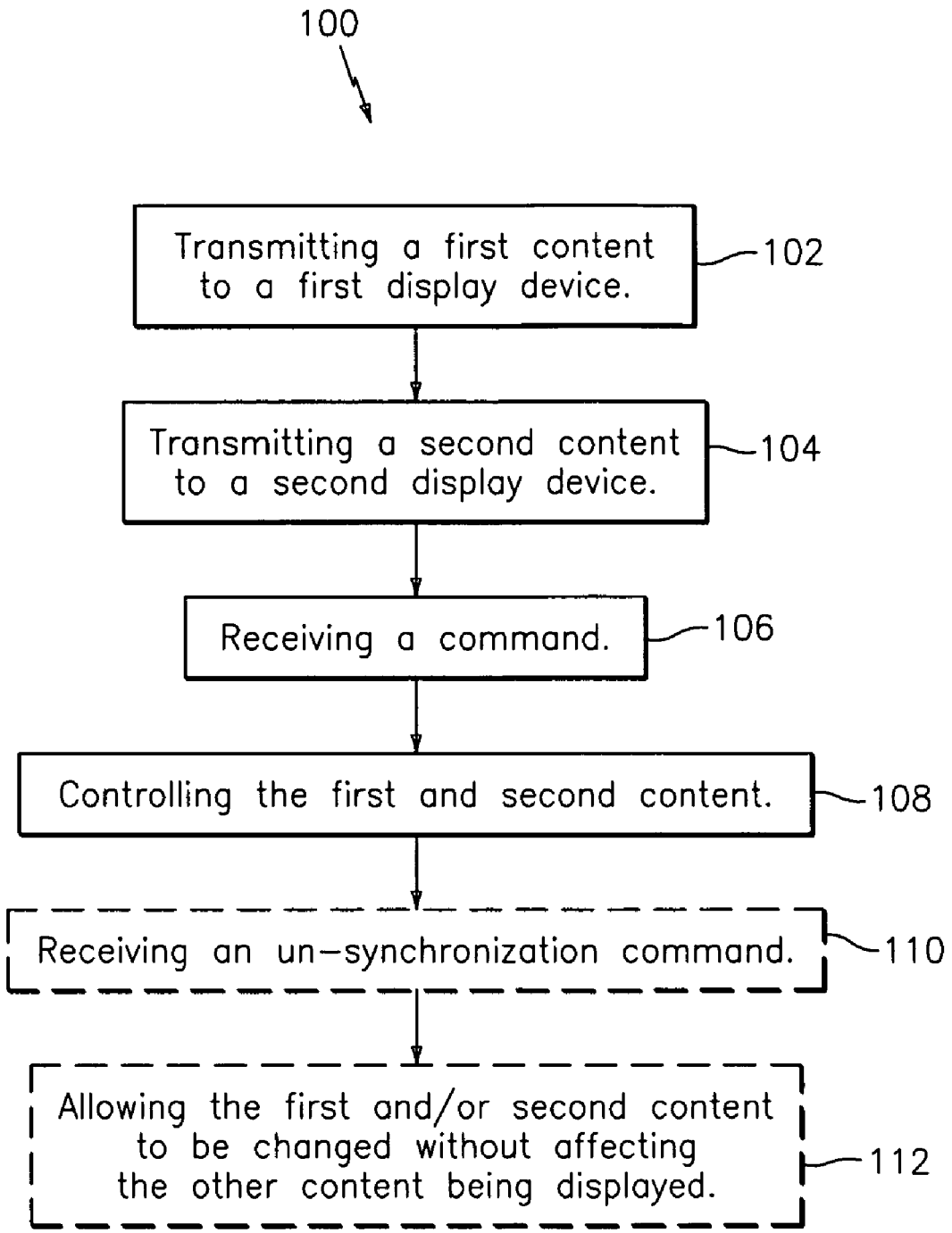
FIG. 3 illustrates a flow chart of a method for providing multi-content synchronization control in exemplary embodiments.

Turning now to FIG. 3, a method for providing multi-content synchronization control in exemplary embodiments is depicted generally as 100. The method 100 for providing multi-content synchronization control includes transmitting a first content to a first display device, as shown at step 102. The method 100 for providing multi-content synchronization control also includes transmitting a second content to a second display device, as shown at step 104. While shown as separate steps, it should be appreciated that steps 102 and 104 may be performed at the same time or in any order. As shown at step 106, the method 100 providing multi-content synchronization control includes receiving a synchronization command. After receiving the synchronization command, the method 100 for providing multi-content synchronization control synchronizes the first and second content responsive to the synchronization command, as shown at step 108. In exemplary embodiments, the controller 16 may include synchronization rules, which may be automatically applied to the first and second content. For example, a user may set a synchronization rule to automatically synchronize a second content when a specific first content is being displayed. In exemplary embodiments, a user, through the use of the input device 24, can configure the synchronization rules developed by the user, or provided by an application which has user selectable options for controlling or providing the synchronization rules.

Continuing with reference to FIG. 3, the method 100 for providing multi-content synchronization control may also include receiving a un-synchronization command, as shown by the dotted lines at step 110. After receiving the un-synchronization command, the method 100 for providing multi-content synchronization control allows the first and/or second content displayed by the first or second display device to be changed without affecting the content being displayed by other display devices, as shown by the dotted lines at step 112.

Figure 4:
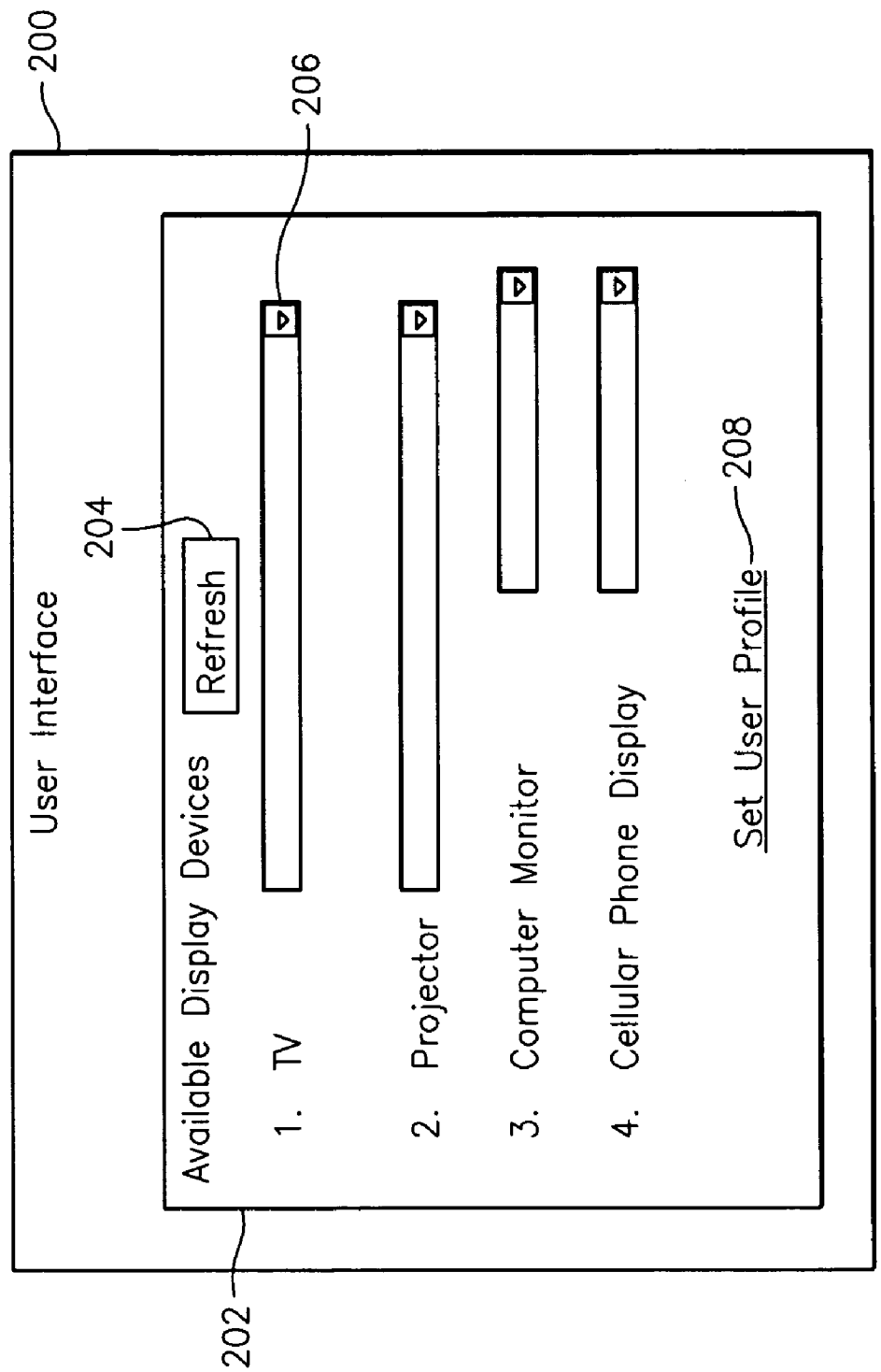
FIG. 4 illustrates a user interface for a computer program product for providing multi-content synchronization control in accordance with exemplary embodiments.

Turning now to FIG. 4, a user interface for a computer program product for providing interactive content control in accordance with exemplary embodiments is depicted generally as 200. The user interface 200 allows a user to turn on and off interactive content streams and change what interactive content is being displayed on each available display device. The user interface 200 includes a list 202 of available display devices and an associated refresh option 204, which may be used to update the list 202 of available display devices. The user interface 200 also includes an associated content field 206 corresponding to each available display device. In an exemplary embodiment, the associated content field 206 may be in the form of a drop-down menu, which can be used to easily correlate an interactive content with a display device. The user interface 200 may also include a user profile function 208, which can be used to pre-define the associations/correlations based upon the type or source of the interactive content displayed on the primary display device. For example, a user may wish to set a profile to automatically display a specific secondary interactive content, such as director's information or actors list, when a movie is displayed on the primary display device. In exemplary embodiments, the profile may define associations or correlations of the primary and auxiliary interactive content, which may be based upon the types of interactive content, the sources of the interactive content, the format of the interactive content, or the like.

While the multi-content synchronization control system and method have been discussed primarily with reference to first and second display devices, it will be appreciated by those of ordinary skill in the art that any number of display devices may be used. In an exemplary embodiment, a primary display device may emit a primary content while several auxiliary display devices each emit a secondary content, which can be synchronized with the primary content. For example, a sporting event may be displayed by a primary display, and multiple auxiliary display devices may emit box scores, team news, or the like. In another example, a primary display may emit a primary video feed of an event, and several auxiliary display devices may emit multiple alternative perspectives of the event. While the primary and secondary content have been discussed primarily with reference to traditional television broadcasts, it will be recognized by those of ordinary skill in the art that the content may be images, text, video, sensory information (e.g., vibrate, heat, and the like), other types of experience-related components, or any combination thereof.

Exemplary embodiments may include systems, methods and computer-implemented processes and apparatuses for practicing those processes. Embodiments may also include computer program code containing instructions embodied in tangible media, such as floppy diskettes, CD-ROMs, hard drives, or any other computer-readable storage medium, wherein when the computer program code is loaded into and executed by a computer, the computer becomes an apparatus for practicing the invention. Embodiments may further include computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention.

What is claimed is:

1. A system for providing content comprising:
a controller in operable communication with a first display device and a second display device and providing a first content to the first display device and a second interactive content to the second display device, wherein the first content is broadcast programming and the second interactive content is interactive content related to the first content, the first content and the second interactive content being synchronized by a content provider;
an interface for receiving a command from a user, wherein the controller selectively controls the first content displayed by the first display device and the second interactive content displayed by the second interactive display device in response to the command;
wherein the command is for un-synchronizing the first content and the second interactive content such that changes to the second interactive do not affect the first content, the changes including the user selecting a new second interactive, and changes to the first content do not affect the second interactive content;
wherein after having un-synchronized the first content and the second interactive content the interface receives a further command from the user, the further command for re-synchronizing the first content and the second interactive content such that changes effected by user to the second interactive content affect the first content, and changes effected by the user to the first content affect the second interactive content, wherein changes to the first content including the user selecting a new first content and changes to the second interactive content including the user selecting a new second interactive content.

2. The system of claim 1, wherein the controller receives content from at least one content provider.

3. The system of claim 2, wherein the content provider is at least one of the following:
a cable television provider;
a digital satellite provider;
a traditional analog television provider;
an internet service provider;
an internet content provider;
a commercial content provider;
a network gaming provider;
a digital cable provider; or
a digital broadcast provider.

4. The system of claim 1, wherein at least one of the first and second display devices is at least one of the following:
a plasma display;
a LCD display;
a DLP display;
a SED display;
a CRT display; or
an electroluminescence display.

5. The system of claim 2, wherein the controller communicates with one or more content provider(s) over at least one communications network.

6. The system of claim 1, wherein the command is for synchronizing the first content and the second interactive content.

7. The system of claim 1, wherein the command is for changing at least one of the first content and the second interactive content.

8. A method of providing interactive content comprising:
transmitting a first content to a first display device;
transmitting a second interactive content to a second display device, wherein the first content is broadcast programming and the second interactive content is interactive content related to the first content, the first content and the second interactive content being synchronized by the broadcast provider;
receiving a command from a user; and
controlling display of the first content and the second interactive content responsive to the command;
wherein the command is for un-synchronizing the first content and the second interactive content and the second interactive content such that changes to the second interactive content do not affect the first content, the changes including the user selecting a new second interactive content, and changes to the first content do not affect the second interactive content;

wherein after having un-synchronized the first content and the second interactive content the interface receives a further command from the user, the further command for re-synchronizing the first content and the second interactive content such that changes effected by user to the second interactive content affect the first content, the changes to the second interactive content including the user selecting a new second interactive content, and changes effected by the user to the first content affect the second interactive content, the changes to the first content including the user selecting a new first content.

9. The method of claim 8, wherein the command is for synchronizing the first content and the second interactive content.

10. The method of claim 8, wherein the command is for changing at least one of the first content and the second interactive content.

11. The method of claim 8, wherein at least one of the first and second interactive content is at least one of the following: a television broadcast, a webpage, a commercial, a video or audio stream, or an audio broadcast.

12. The method of claim 8, further comprising receiving the first and the second interactive content from a content provider.

13. A computer program product for providing interactive content, the computer program product comprising:
 a storage medium readable by a processing circuit and storing instructions for execution by the processing circuit for facilitating a method comprising:
 transmitting a first content to a first display device;
 transmitting a second interactive content to a second display device, wherein the first content is broadcast programming and the second interactive content is interactive content related to the first content, the first content and the second interactive content being synchronized by the broadcast provider;
 receiving a command from a user; and
 controlling display of the first content and the second interactive content responsive to the command;
 wherein the command is for un-synchronizing the first content and the second interactive content and the second interactive content such that changes to the second interactive content do not affect the first content, the changes including the user selecting a new second interactive content, and changes to the first content do not affect the second interactive content;
 wherein after having un-synchronized the first content and the second interactive content the interface receives a further command from the user, the further command for re-synchronizing the first content and the second interactive content such that changes effected by user to the second interactive content affect the first content, the changes to the second interactive content including the user selecting a new second interactive content, and changes effected by the user to the first content affect the second interactive content, the changes to the first content including the user selecting a new first content.

14. The computer program product of claim 13, wherein the command is for synchronizing the first content and the second interactive content.

15. The computer program product of claim 13, wherein the command is for changing at least one of the first content and the second interactive content.

16. The computer program product of claim 13, wherein at least one of the first and the second interactive content is at least one of the following: a television broadcast, a webpage, a video game, a commercial, or an audio broadcast.

17. The computer program product of claim 13, wherein the first and the second content is received from a content provider.

\* \* \* \* \*